United States Patent
Kawahara (10) Patent No.: US 6,677,990 B1
(45) Date of Patent: *Jan. 13, 2004

(54) CONTROL DEVICE FOR IMAGE INPUT APPARATUS

(75) Inventor: Hiroyuki Kawahara, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 192 days.

(21) Appl. No.: 08/714,962

(22) Filed: Sep. 17, 1996

Related U.S. Application Data (63) Continuation of application No. 08/278,750, filed on Jul. 22, 1994, now abandoned.

(30) Foreign Application Priority Data

Jul. 27, 1993 (JP) .............................................. 5-185366

(51) Int. Cl.⁷ ............................................. H04N 5/232
(52) U.S. Cl. .............................. 348/211.13; 348/207.11
(58) Field of Search ............................. 348/13, 15, 20, 348/142, 143, 152, 155, 211, 212, 213, 214, 169–172, 14.1; 318/560, 568.19, 640; 345/326–330, 903; H04N 7/15

(56) References Cited

U.S. PATENT DOCUMENTS

| | | | | |
|---|---|---|---|---|
| 3,579,072 A | * | 5/1971 | Plummer | 318/609 |
| 4,081,830 A | * | 3/1978 | Mick et al. | 348/155 |
| 4,720,805 A | * | 1/1988 | Vye | 700/85 |
| 5,068,735 A | * | 11/1991 | Tuchiya et al. | 348/213 |
| 5,164,827 A | * | 11/1992 | Paff | 348/143 |
| 5,206,721 A | * | 4/1993 | Ashida et al. | 348/211 |
| 5,278,643 A | * | 1/1994 | Takemoto et al. | 348/213 |
| 5,396,287 A | * | 3/1995 | Cho | 348/14.1 |
| 5,434,617 A | * | 7/1995 | Bianchi | 348/169 |
| 5,479,206 A | * | 12/1995 | Ueno et al. | 348/211.5 |
| 5,523,769 A | * | 6/1996 | Lauer et al. | 345/1 |
| 5,523,783 A | * | 6/1996 | Cho | 348/157 |
| 5,530,796 A | * | 6/1996 | Wang | 345/352 |
| 5,631,697 A | * | 5/1997 | Nishimura et al. | 348/172 |
| 5,801,770 A | * | 9/1998 | Paff et al. | 348/143 |
| 5,815,199 A | * | 9/1998 | Palm et al. | 348/143 |

FOREIGN PATENT DOCUMENTS

| | | | |
|---|---|---|---|
| DE | 3933255 | 5/1991 | G02B/23/06 |
| EP | 149118 | 7/1985 | G02B/27/64 |
| EP | 458373 | 11/1991 | H04N/5/232 |
| JP | 59228473 | 12/1984 | H04N/5/26 |
| JP | 60-152193 | 8/1985 | H04N/13/00 |
| JP | 02-117291 | 5/1990 | H04N/7/15 |
| JP | 04-068893 | 3/1992 | |
| JP | 4-302587 | * 10/1992 | H04N/5/222 |
| JP | 04-323990 | 11/1992 | H04N/7/15 |
| JP | 04-361494 | 12/1992 | H04N/7/15 |

OTHER PUBLICATIONS

JEE Journal of Electronic Engineering, "Canon's Variangle Prism Optically Corrects Image Blur," vol. 29, No. 306, Jun. 1992, Tokyo, Japan, pp. 84–85.

\* cited by examiner

*Primary Examiner*—Aung Moe
(74) *Attorney, Agent, or Firm*—Robin, Blecker & Daley

(57) ABSTRACT

A control device for an image input apparatus which is equipped with an optical system having a magnification varying lens, includes a monitor for displaying input images, an input device which enables an arbitrary position on a display screen of the monitor to be designated, a calculation device for calculating the distance between a predetermined position on the display screen and the arbitrary position on the basis of zooming information of the optical system, and a controller for controlling the image input apparatus in accordance with the calculation results obtained by the calculation device.

8 Claims, 7 Drawing Sheets

MONITOR SCREEN

CONTROL DEVICE FOR IMAGE INPUT APPARATUS

This is a continuation application under 37 CFR 1.62 of prior application Ser. No. 08/278,750, filed Jul. 22, 1994, abandoned.

BACKGROUND OF THE INVENTION

1. Field of the Invention

This invention relates to a control device for an image input apparatus and, more specifically, to a control device which is suitable for remotely operating a camera as in the case of a video conference system.

2. Description of the Related Art

With the improvement of computers in terms of image processing capability, there have been proposed various techniques in which camera operations, such as zooming, panning and tilting, are performed by operating a computer while the photographic image is being displayed on a monitor screen of the computer. In particular, in a video conference system, it is desirable that the orientation (pan, tilt), magnification, etc., of the camera at the other end of the communications line be remotely controllable. For that purpose, there has been proposed, for example, a system in which camera operation factors, which are to be controlled by using a mouse or the like, are displayed on a part of the monitor screen.

However, in the above system, it is rather difficult to perform fine adjustment. Moreover, it is by no means easy to determine which factor is to be controlled, and to what degree, so that the operator has to depend on trial-and-error methods. When a camera is to be remotely controlled as in the case of a video conference system, the time lag involved in transmitting the control signal must also be taken into account. In addition, the image is subjected to high-efficiency coding before being transmitted. Thus, the image quality is generally rather poor when the image information changes fast as in the case of panning, thereby making the camera operation still more difficult. In other words, a fine adjustment is impossible.

SUMMARY OF THE INVENTION

It is an object of the present invention to provide an image-input-apparatus control device improved in operability.

In accordance with an embodiment of the present invention, there is provided a control device for an image input apparatus which is equipped with an optical system having a magnification varying lens, the control device comprising display means for displaying input images, input means which enables an arbitrary position on a display screen of the display means to be designated; calculation means for calculating the distance between a predetermined position on the display screen and the arbitrary position on the basis of zooming information of the optical system, and control means for controlling the image input apparatus in accordance with calculation results obtained by the calculation means.

Other objects and features of the present invention will become apparent from the following detailed description of the invention and the accompanying drawings.

DETAILED DESCRIPTION OF THE PREFERRED EMBODIMENT

An embodiment of the present invention will now be described with reference to the drawings.

Figure 1:
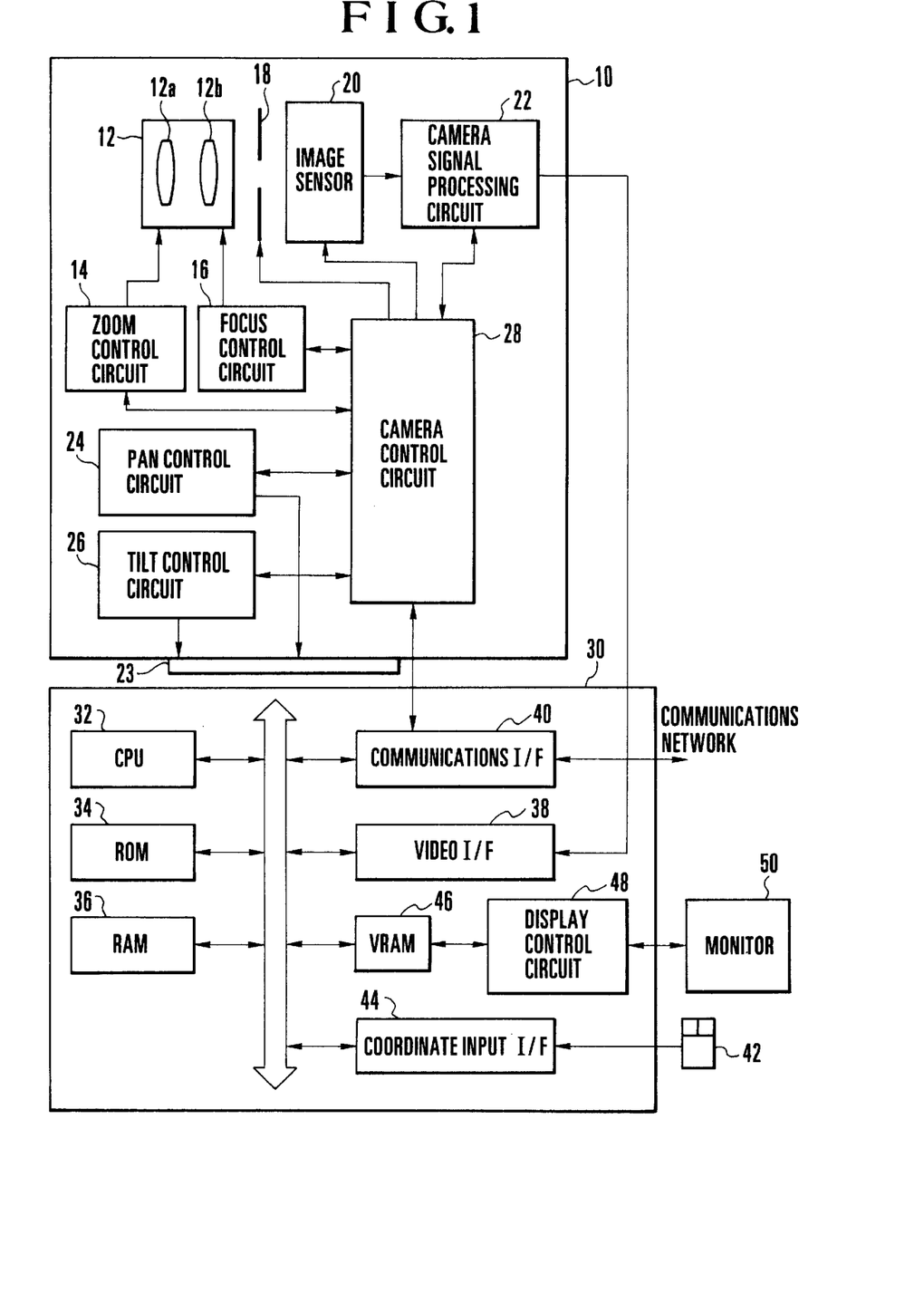
FIG. 1 is a schematic block diagram showing an embodiment of the present invention.

FIG. 1 is a schematic block diagram showing an embodiment of the present invention as applied to a terminal in a video conference system. Numeral 10 indicates a camera for photographing a user of the system; numeral 12 indicates a photographing zoom lens unit; numeral 14 indicates a zoom control circuit for moving a zooming lens 12a of the lens unit 12 in the direction of the optical axis; numeral 16 indicates a focus control circuit for moving a focusing lens 12b of the lens unit 12 in the direction of the optical axis; numeral 20 indicates an image sensor which converts optical images obtained by the lens unit 12 and an aperture 18 to electric signals; and numeral 22 indicates a camera signal processing circuit for converting the electric signals obtained by the image sensor 20 to video signals.

Numeral 24 indicates a pan control circuit which is on a pan head 23 and which moves the photographic optical axis of the camera 10 to the right and left; numeral 26 indicates a tilt control circuit which is on the panhead 23 and which moves the photographic optical axis of the camera 10 up and down; and numeral 28 indicates a camera control circuit for controlling the camera 10 as a whole.

Numeral 30 indicates a computer constructed in the same way as ordinary computers; numeral 32 indicates a CPU for overall control; numeral 34 indicates a ROM; numeral 36 indicates a RAM; numeral 38 indicates a video interface to which output video signals from the camera 10 are input; and numeral 40 indicates a communications interface which transmits and receives data and control signals to and from an external communications network and transmits and receives control signals to and from the camera 10.

Numeral 42 indicates a coordinate input device consisting of a digitizer, a mouse or the like; numeral 44 indicates an interface for the coordinate input device 42; numeral 46 indicates a video memory (VRAM); and numeral 48 indicates a display control device for controlling the image display of a monitor 50 consisting of a CRT, a liquid crystal display or the like.

Figure 2:
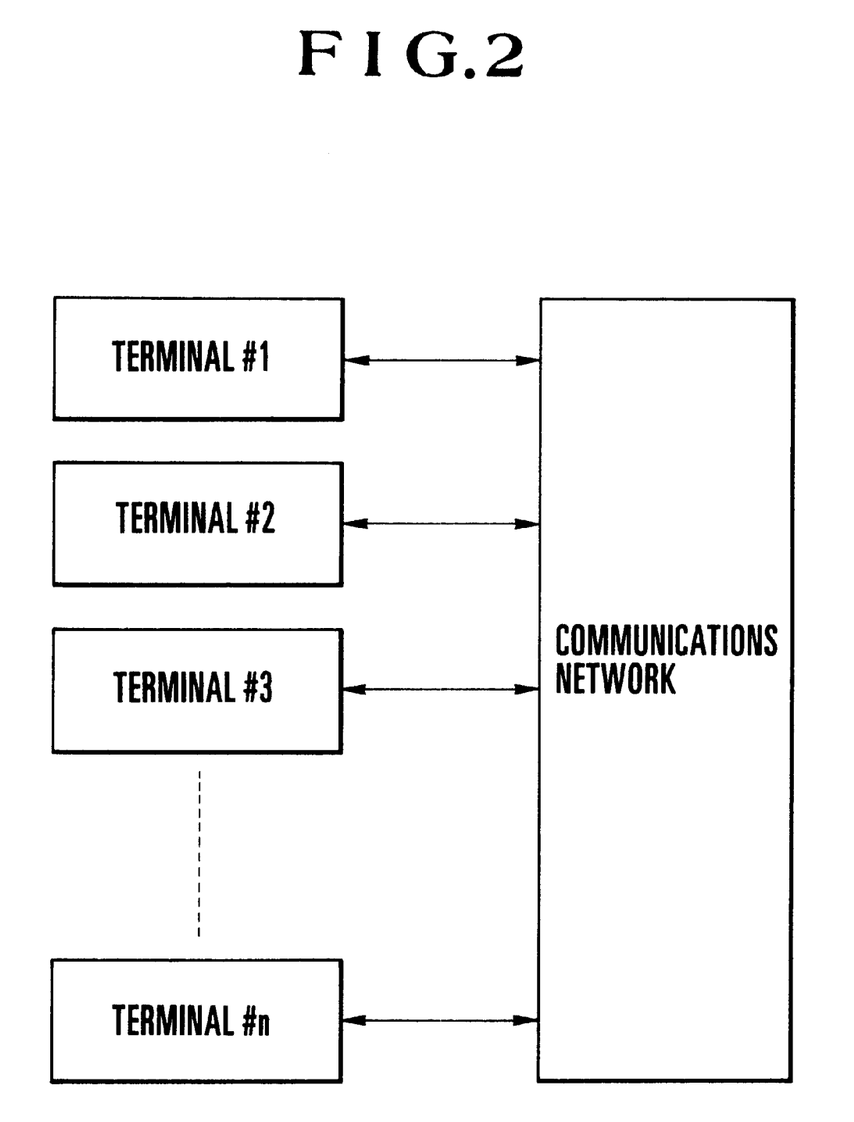
FIG. 2 is a schematic diagram of the embodiment connected to a communications network.

As shown in FIG. 2, a number of terminals as shown in FIG. 1 are connected to each other through the intermediation of a communications network.

Next, the operation of this embodiment will be described with reference to FIGS. 1 and 3. This embodiment functions in a particularly effective manner when applied to a case where it is used to remotely control a camera at an image transmission end terminal from an image reception end terminal in a video conference which is being executed between terminals. However, for convenience of description, the operation of this embodiment will be explained with reference to a case where the camera 10 is operated within the system shown in FIG. 1. The features of this embodiment as utilized in the above two cases are the same except for the fact that the processes of image coding and decoding are omitted in the latter case.

A photographic image obtained by the camera 10 is written to the memory 46 through the video interface 38. The display control circuit 48 successively reads image data stored in the video memory 46, whereby the monitor 50 is controlled to display the image.

The user designates an arbitrary position (x, y), which he or she intends to be the center, through the coordinate input device 42 (S1). The CPU 32 calculates the disparity ($\Delta X$, $\Delta Y$) between the designated position (x, y) and the coordinates (a, b) of the center of the photographic image displayed on the screen (when no window display system is adopted, it is the center of the screen of the monitor 50 and, when a window display system is adopted, it is the center of the display window of the photographic image) (S2). That is, the CPU 32 calculates the following values:

$$\Delta X = x - a$$

$$\Delta Y = y - b$$

Then, the CPU 32 transfers a movement command, e.g., a command Mov ($\Delta X$, $\Delta Y$), to effect movement through a distance corresponding to the disparity ($\Delta X$, $\Delta Y$) to the camera control circuit 28 of the camera 10 through the communications interface 40 (S3).

Upon receiving this movement command (S4), the camera control circuit 28 first obtains zooming position information of the zooming lens 12a from the zoom control circuit 14 (S5), and determines the conversion factor k of the amount of movement from the zooming position information thus obtained (S6). That is, the photographic image is displayed in a size corresponding to the variable magnification of the lens unit 12. For example, as shown in FIG. 4, distances which appear the same when displayed on the screen of the monitor 50 are different from each other in the actual field depending upon the magnification, i.e., the angle of view. In view of this, it is necessary to convert a distance on the monitor screen to an amount of movement corresponding to the angle of view (the pan angle and the tilt angle). For this purpose, the camera control circuit 28 is equipped with a conversion table for determining the conversion factor k.

The determined conversion factor k is multiplied by the parameters $\Delta X$ and $\Delta Y$ of the movement command Mov ($\Delta X$, $\Delta Y$) from the computer 30 to calculate the actual amount of movement ($\Delta Xr$, $\Delta Yr$) (S7). That is, the following values are calculated:

$$\Delta Xr = k \Delta X$$

$$\Delta Yr = k \Delta Y$$

The camera control circuit 28 determines the pan and tilt angles of rotation in accordance with the actual amount of movement ($\Delta Xr$, $\Delta Yr$) (S8) to control the pan control circuit 24 and the tilt control circuit 26, thereby pointing the photographic optical axis of the camera 10 in the designated direction (S9).

Figure 3:
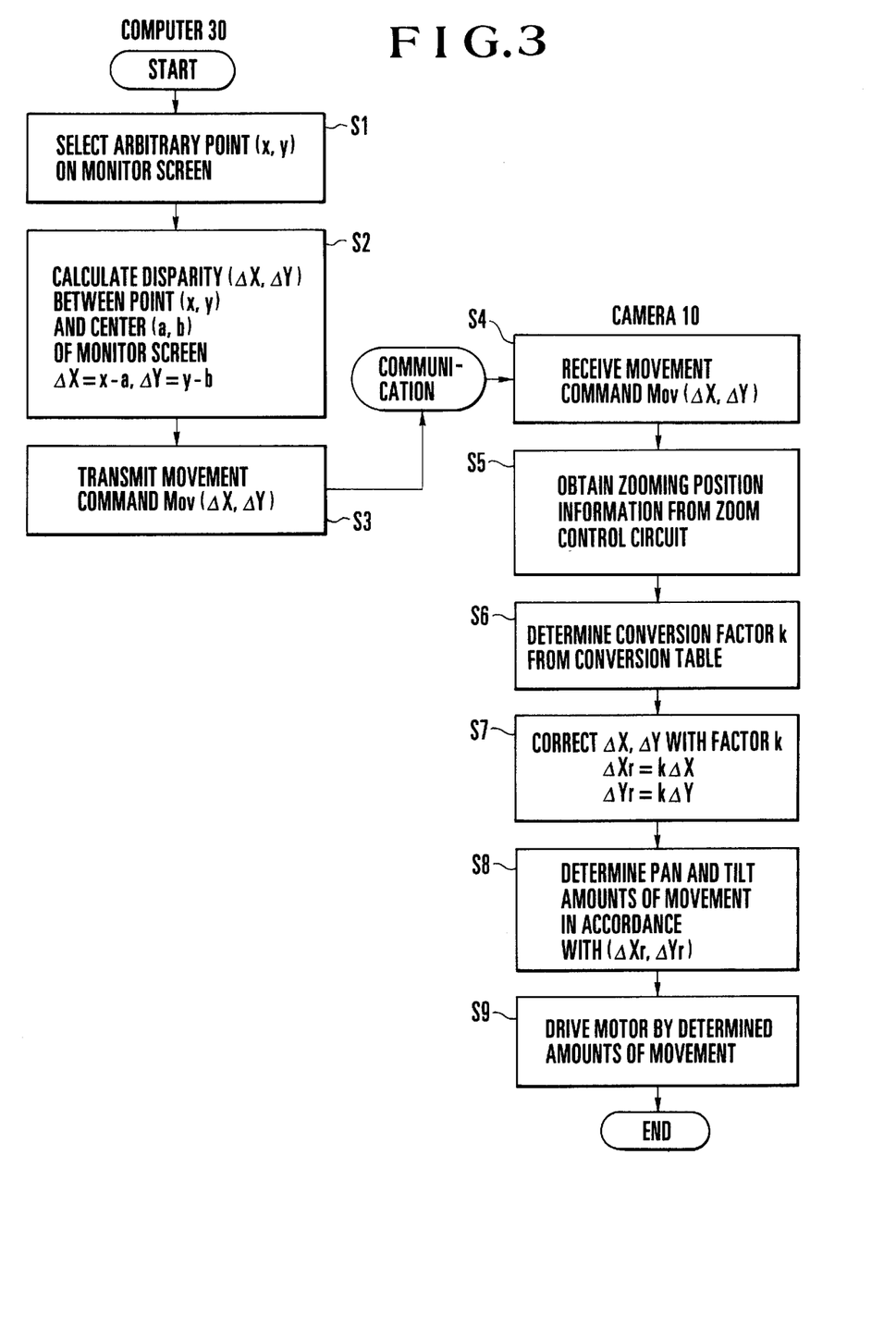
FIG. 3 is a flowchart illustrating a first operation of this embodiment.
Figure 4:
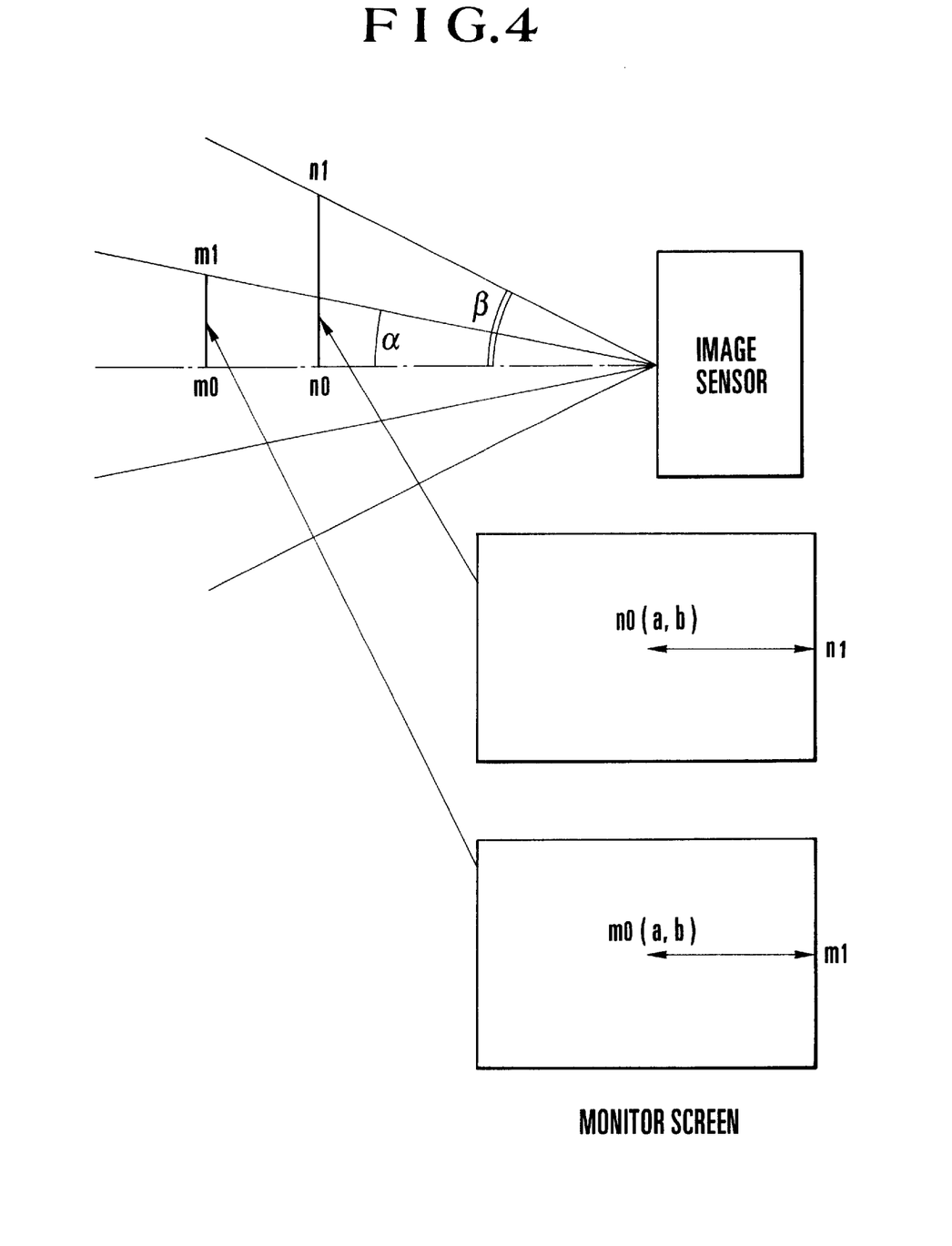
FIG. 4 is a diagram illustrating how distances as displayed on a monitor screen are related to the corresponding angles of view.
Figure 5:
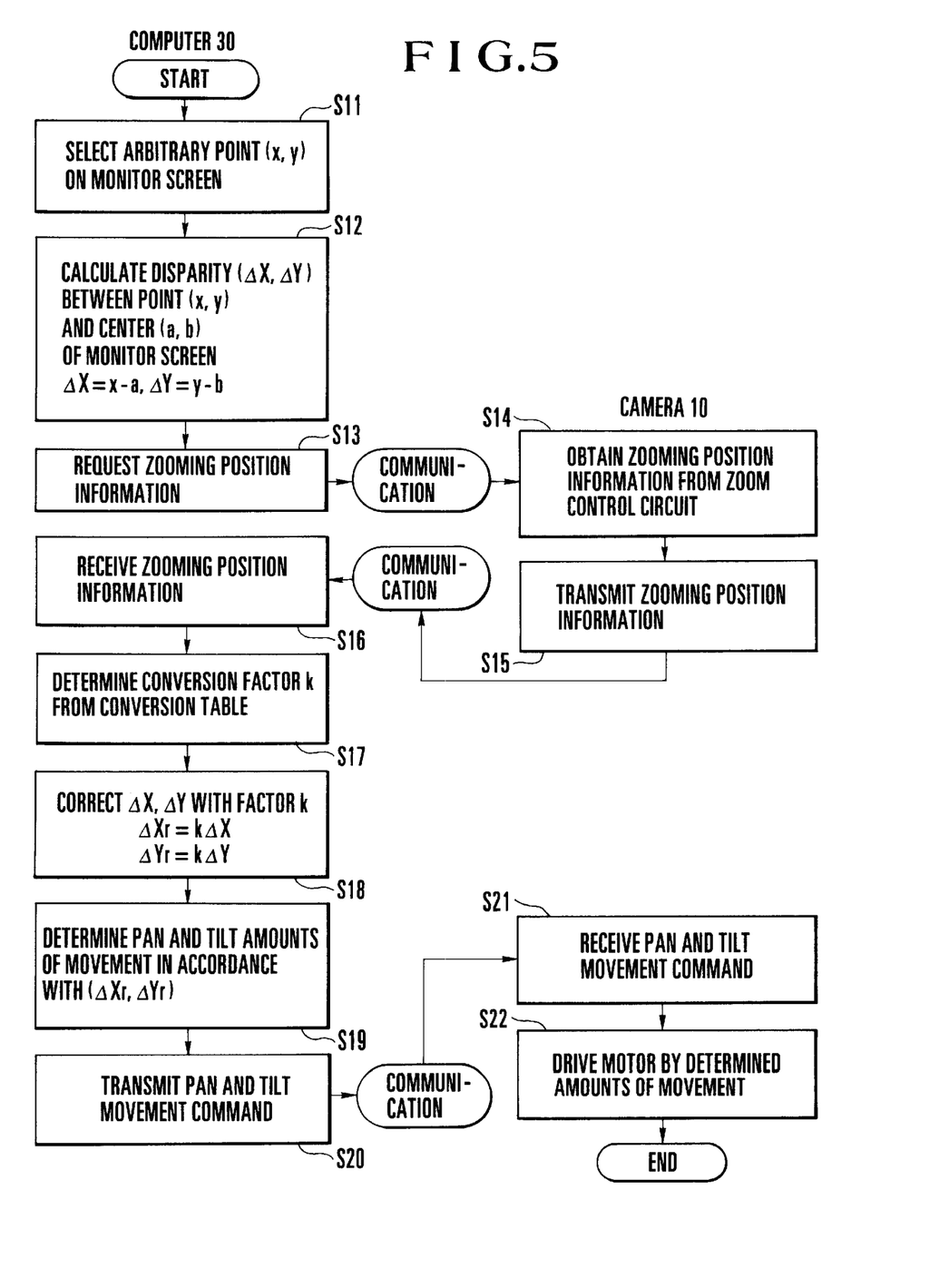
FIG. 5 is a flowchart illustrating a second operation of this embodiments.

While in FIG. 3 the camera control circuit 28 of the camera 10 calculates an amount of movement of the camera 10 with respect to the amount of movement as designated on the monitor screen, it is naturally also possible for this calculation to be performed by the CPU 32 of the computer 30. FIG. 5 shows a flowchart for the latter case which differs from the above-described case in that the zooming position information of the zooming lens 12a is transferred from the camera 10 to the computer 30, which calculates the pan and tilt angles of movement and transfers them to the camera 10.

That is, the user designates an arbitrary position (x, y), which he or she intends to be the center of the photographic image displayed on the monitor 50, by using the coordinate input device 42 (S11). The CPU 32 calculates the disparity ($\Delta X$, $\Delta Y$) between the designated position (x, y) and the coordinates (a, b) of the center of the photographic image as displayed on the screen (when no window display system is adopted, it is the center of the screen of the monitor 50 and, when a window display system is adopted, it is the center of the display window of the photographic image) (S12). Then, the CPU 32 requires the camera 10 to provide zooming position information (S13).

Upon the request of zooming position information from the computer 30, the camera control circuit 28 of the camera 10 obtains zooming position information from the zoom control circuit 14 (S14), and transfers it to the computer 30 (S15).

The CPU 32 determines the conversion factor k from the zooming position information from the camera 10 (S16, S17). In this example, the CPU 32 is equipped with a conversion factor table for converting a distance on the screen of the monitor 50 to an amount of movement corresponding to the angles of view (the pan and tilt angles), and determines the conversion factor k.

The CPU 32 multiplies the determined conversion factor k by the previously calculated $\Delta X$ and $\Delta Y$ to calculate the actual amount of movement ($\Delta Xr$, $\Delta Yr$) (S18), and determines the pan and tilt angles of rotation corresponding to the calculated actual amount of movement ($\Delta Xr$, $\Delta Yr$), transmitting a movement command of that angle of rotation to the camera 10 (S20).

The camera control circuit 28 of the camera 10 receives the movement command from the computer 30 (S21), and controls the pan control circuit 24 and the tilt control circuit 26 in accordance with the command to point the photographic optical axis of the camera 10 in the designated direction (S22).

Figure 6:
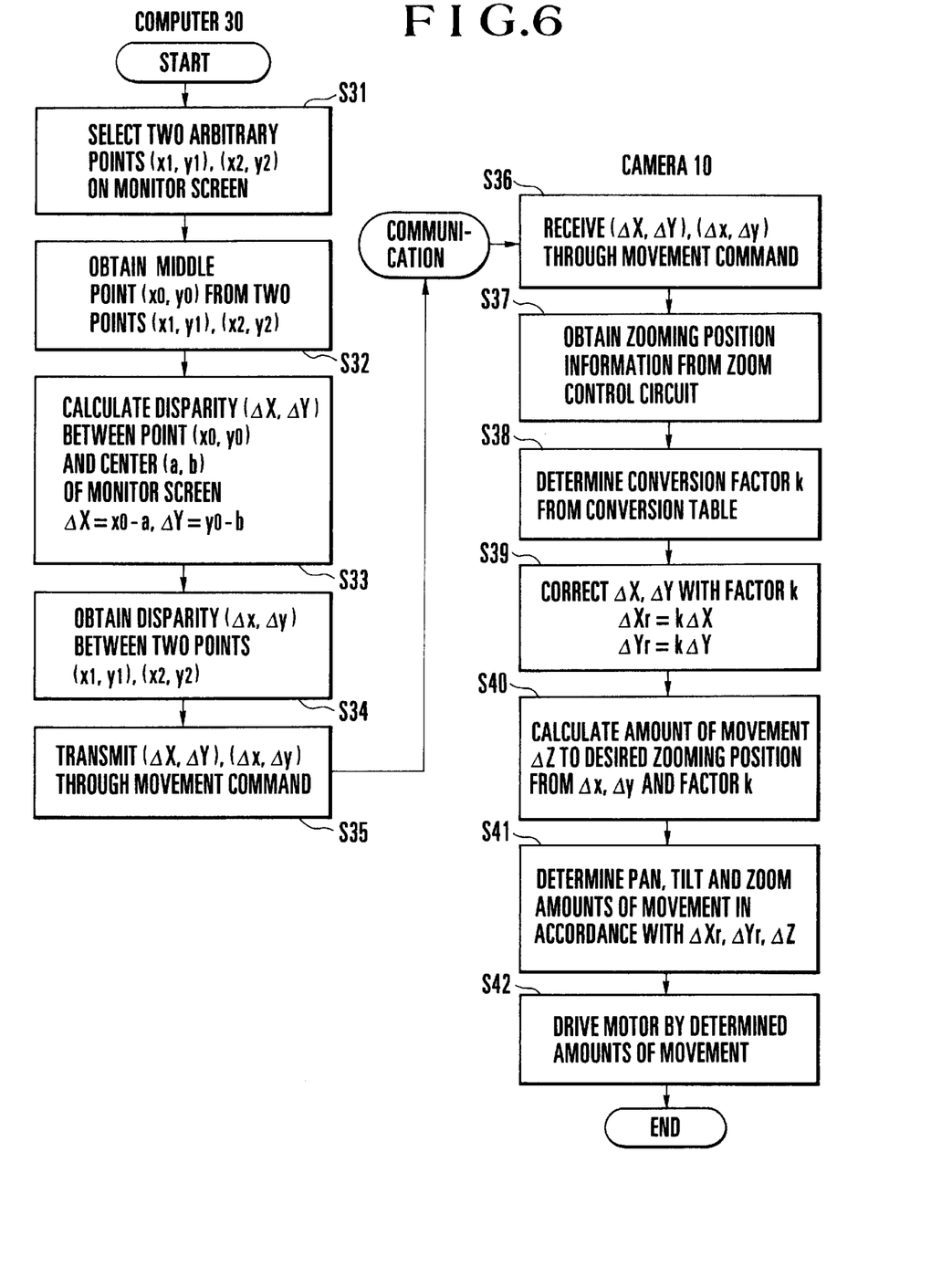
FIG. 6 is a flowchart illustrating a third operation of this embodiment.

Next, a case in which a photographic range is designated by two points on the screen of the monitor 50 will be described with reference to FIG. 6. The user designates two points (x1, y1) and (x2, y2) in the photographic image plane, which is displayed on the monitor 50, by the coordinate input device 42 (S31). The CPU 32 calculates a middle point (x0, y0) thereof from the designated two points (x1, y1) and (x2, y2) (S32). The CPU32 calculates the difference ($\Delta X$, $\Delta Y$) between the middle point (x0, y0) and the coordinates (a, b) of the center of the photographic-image displaying portion of the monitor 50 (when no window display system is adopted, it is the center of the entire screen of the monitor 50, and when a window display system is adopted, it is the center of the photographic image display window) (S33). That is, the CPU 32 calculates the following values:

$$\Delta X = x0 - a$$

$$\Delta Y = y0 - b$$

Further, the CPU calculates the difference ($\Delta x$, $\Delta y$) between the two designated points, that is, the following values (S34):

$$\Delta x = x1 - x2$$

$$\Delta y = y1 - y2$$

The CPU 32 transfers a movement command in which the differences (ΔX, ΔY) and (Δx, Δy) are used as parameters to the camera 10 (S35). The camera control circuit 28 of the camera 10 receives this command thus transferred (S36), and obtains zooming position information of the zooming lens 12a from the zoom control circuit 14 (S37), determining the conversion factor k of the pan and tilt amounts of movement from the zooming position information thus obtained (S38).

The camera control circuit 28 multiplies the determined conversion factor k by the parameters ΔX and ΔY of the movement command from the computer 30 to calculate the actual amount of movement (ΔXr, ΔYr), that is, the following values (S39):

$$\Delta Xr = k\Delta X$$

$$\Delta Yr = k\Delta Y$$

Further, the camera control circuit 28 calculates the amount of movement to a desired zooming position, Δz, from the parameters Δx and Δy from the computer 30 and the factor k (S40).

The camera control circuit 28 calculates the actual amounts of movement corresponding to the actual amount of movement (ΔXr, ΔYr) calculated in step S39, and calculates the amount of zooming movement corresponding to the amount of movement Δz calculated in step S40 (S41). It then controls the pan control circuit 24, the tilt control circuit 26 and the zoom control circuit 14, pointing the photographic optical axis of the camera 10 in the designated direction and changing the magnification of the lens unit 12 (S42).

Figure 7:
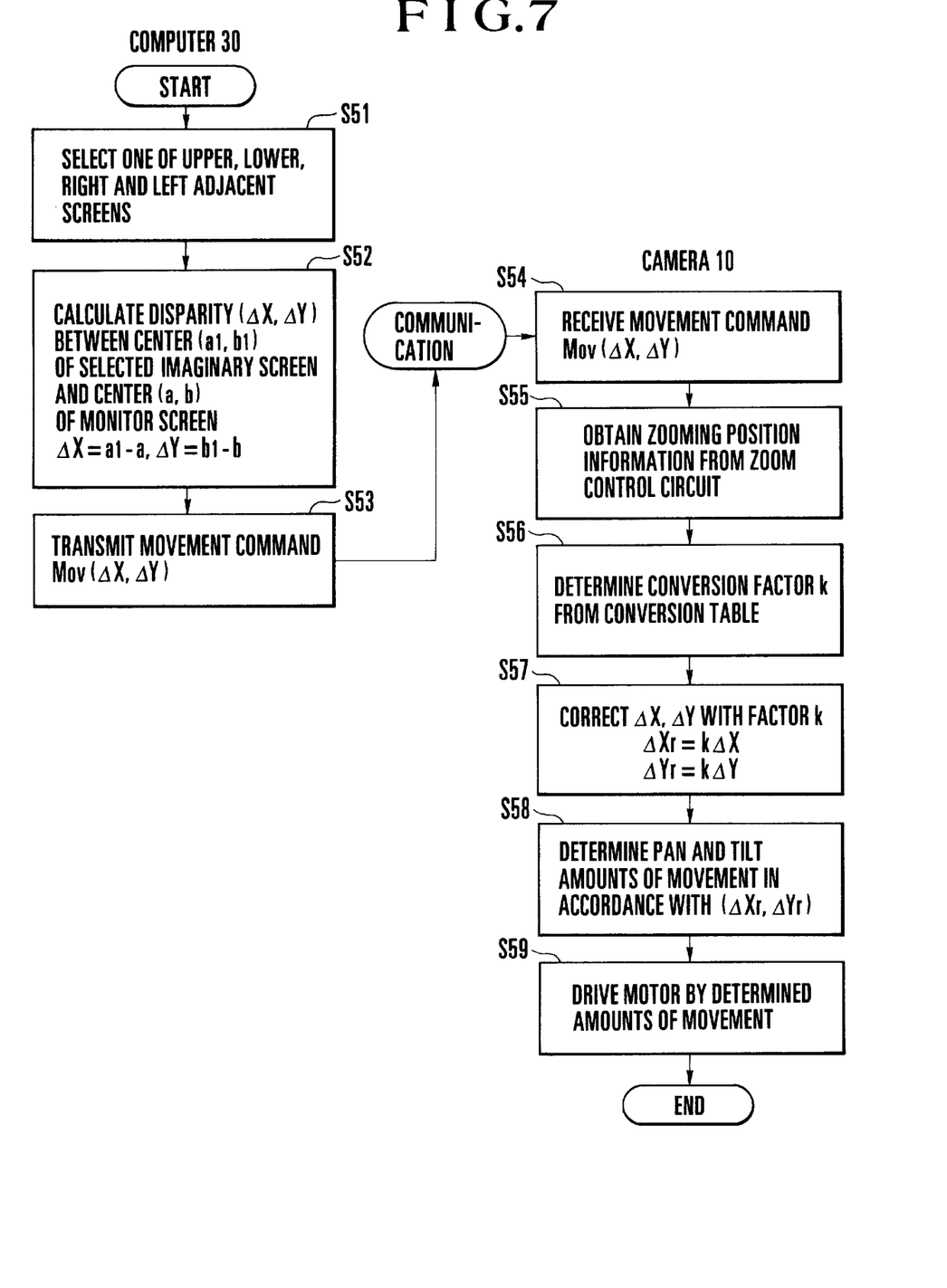
FIG. 7 is a flowchart illustrating a fourth operation of this embodiment.

The above-described embodiment is not effective when the user wishes to observe ranges other than that displayed on the monitor screen. In such a case, the user has to move the zooming lens 12a of the camera 10 to wide-angle end through another operation, and then perform the above operation. These procedures could be simplified by the following procedures. The CPU sets imaginary screens above and below, and on the right and left-hand sides, of the display screen displaying an image that is being photographed. These imaginary screens may be adjacent to, or partly overlap, or spaced apart from, the actual display screen. FIG. 7 shows the flowchart of an operation utilizing such imaginary screens.

The user selects one of the imaginary screens by the coordinate input device 42 or the like (S51). The CPU 32 calculates the disparity between the center (a1, b1) of the selected imaginary screen and the coordinates (a, b) of the center of the displayed photographic image (when no window display system is adopted, it is the center of the screen of the monitor 50 and, when a window display system is adopted, it is the center of the display window of the photographic image), that is, the CPU calculates the following values (S52):

$$\Delta X = a1 - a$$

$$\Delta Y = b1 - b$$

Then, the CPU 32 transfers a movement command corresponding to the difference (ΔX, ΔY), e.g., Mov (ΔX, ΔY), to the camera control circuit 28 of the camera 10 through the communications interface 40 (S53).

The camera control circuit 28, which receives this movement command (S54), first obtains the zooming position information of the zooming lens 12a from the zoom control circuit 14 (S55), and then determines the conversion factor k of the amount of movement from the obtained zooming position information, as in the above described case (S56).

The camera control circuit 28 multiplies the determined conversion factor k by the parameters ΔX and ΔY of the movement command Mov (ΔX, ΔY) to calculate the actual amount of movement (ΔXr, ΔYr) (S57). That is, $$\Delta Xr = k\Delta X$$

$$\Delta Yr = k\Delta Y$$

Further, the camera control circuit 28 determines the pan and tilt angles of rotation corresponding to the actual amount of movement (ΔXr, ΔYr), (S58), and controls the pan control circuit 24 and the tilt control circuit 26 to point the photographic optical axis of the camera 10 in the designated direction.

As stated above, the present invention is obviously also applicable to a case where a camera at an image-transmission-end terminal is to be remotely controlled from an image-reception-end terminal in a video conference or the like.

As can be readily understood from the above description, in accordance with this embodiment, a visual and intuitive camera operation can be realized, thereby attaining an improvement in operability. In particular, this embodiment proves markedly effective in cases where remote control is to be performed.

While the above embodiment has been described as applied to optical zooming, which is effected by moving a zooming lens, it is also applicable to electronic zooming, in which captured image data is electronically processed.

What is claimed is:

1. A control apparatus for controlling a camera, comprising:
   a display device arranged to display a current image picked-up by said camera and an imaginary screen which is set to be adjacent to or spaced apart from the current image already picked-up on a same display, wherein said imaginary screen corresponds to a range which shows that said camera can pickup an image by controlling an image pickup direction of said camera; and
   a control device arranged to control the image pickup direction of said camera on the basis of information on the input of an arbitrary position designated on said imaginary screen by an input device.

2. An apparatus according to claim 1, wherein said control device controls the image pickup direction of said camera in such a way that the image at the arbitrary position comes to coincide with a center of the image.

3. An apparatus according to claim 1, wherein said camera has a zoom lens, and said control device controls an image pickup direction of said camera on the basis of information on the input of the arbitrary position designated on said imaginary screen and a present status of said zoom lens.

4. An apparatus according to claim 1, wherein display device displaying the image by a window display system.

5. An apparatus according to claim 1, wherein said imaginary screen overlaps said current image picked-up by said camera.

6. A method of controlling a camera, comprising:
   displaying a current image picked-up by said camera and an imaginary screen which is set to be adjacent to or spaced apart from the current image already picked up on a same display, wherein said imaginary screen corresponds to a range which shows that said camera can pickup an image by controlling an image pickup direction of said camera;

enabling input of an arbitrary position designated on said imaginary screen; and controlling the image pickup direction of said camera on the basis of information on the input of the arbitrary position designated on said imaginary screen.

7. A method according to claim 6, wherein said controlling controls the image pickup direction of said camera in such a way that the image at the arbitrary position comes to coincide with a center of the image.

8. A method according to claim 6, wherein said camera has a zoom lens, and said controlling controls an image pickup direction of said camera on the basis of information on the input of the arbitrary position designated on said imaginary screen and a present status of said zoom lens.

* * * * *